United States Patent [19]

Langlie et al.

[11] Patent Number: 5,032,693

[45] Date of Patent: Jul. 16, 1991

[54] ELECTRIC FENCE INSULATOR WITH LATCHING CAPABILITY

[75] Inventors: Ronald H. Langlie; Jon A. Berg, both of Ellendale, Minn.

[73] Assignee: North Central Plastics, Incorporated, Ellendale, Minn.

[21] Appl. No.: 601,204

[22] Filed: Oct. 19, 1990

Related U.S. Application Data

[63] Continuation-in-part of Ser. No. 398,479, Aug. 25, 1989, Pat. No. 4,965,413.

[51] Int. Cl.[5] ........................ H01B 17/16; A01K 3/00

[52] U.S. Cl. ................................ 174/158 F; 174/171; 174/175

[58] Field of Search ............ 174/158 F, 161 F, 163 F, 174/171, 175; 256/10

*Primary Examiner*—Laramie E. Askin

*Attorney, Agent, or Firm*—Peterson, Wicks, Nemer & Kamrath

[57] ABSTRACT

The electric fence insulator of linear polyethylene plastic includes a body having a rear portion for attaching the body to a fence post. Forwardly of the body is a clip unit having an upper latch mechanism. More specifically, the clip unit includes a first panel integrally attached to the body and a second panel resiliently connected at its lower end to the lower end of the first panel through the agency of a bight portion. The latch mechanism includes an upwardly directed keeper portion having an angled edge thereon and a hook portion having an angled edge thereon, the angled edges being vertically overlapped with respect to each other so that a latching engagement can be effected by manipulating a tab with one's fingers, the tab projecting upwardly from the hook portion. The latch mechanism also includes a rib formed in the hook portion which fits in a channel formed in the keeper portion for preventing slideable movement between the overlapping edges of the hook portion and the keeper portion. When latched, the electric fence insulator securely holds a braided tape-type conductor, yet permitting the release of the conductor when the tab is again manipulated to unlatch the mechanism.

18 Claims, 2 Drawing Sheets

Fig.-2
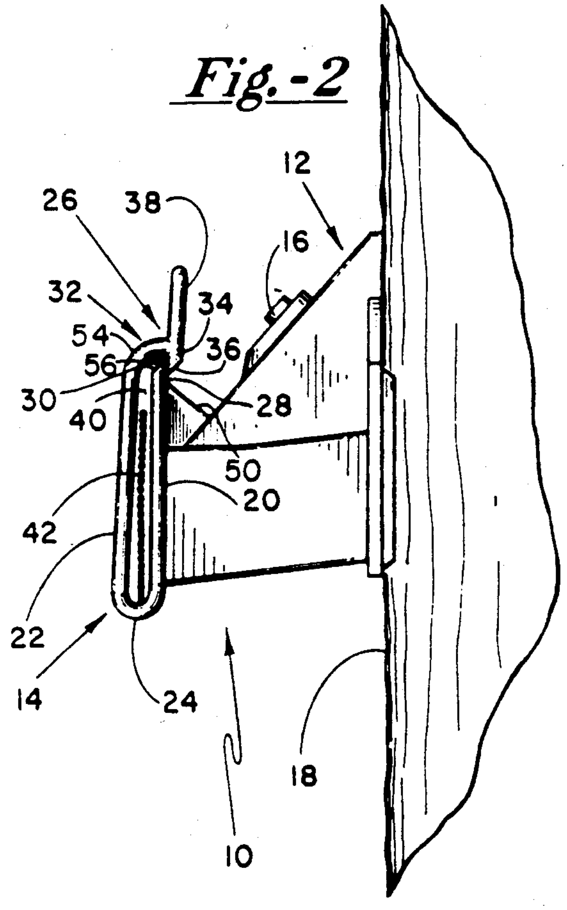
Fig.-3
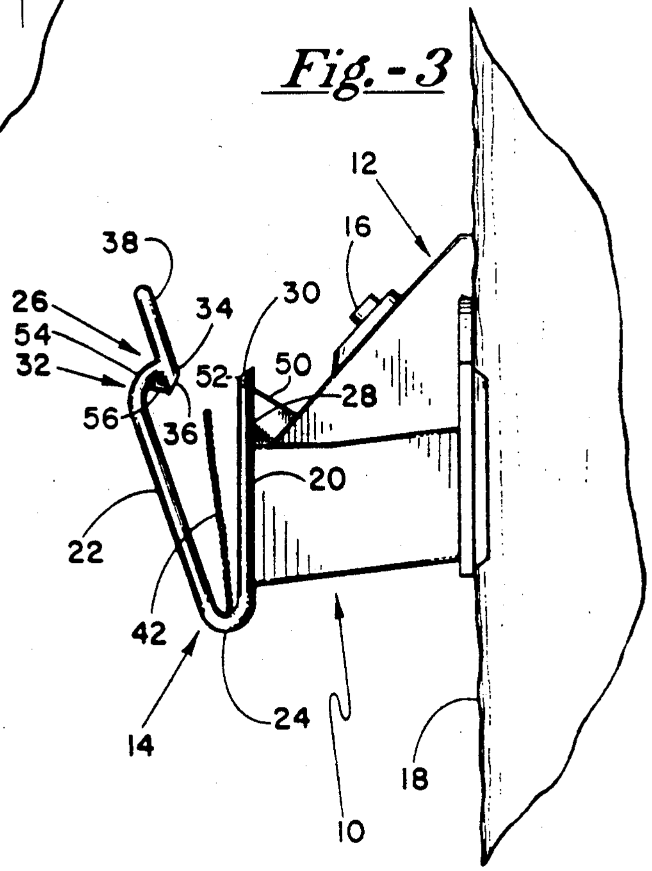
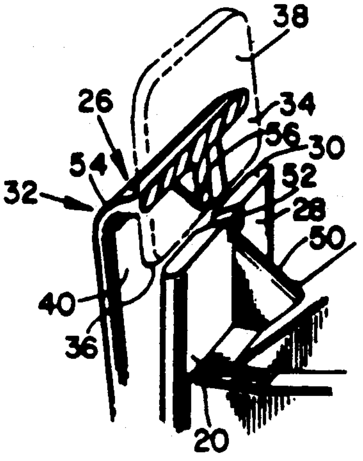
Fig.-4

ELECTRIC FENCE INSULATOR WITH LATCHING CAPABILITY

CROSS REFERENCE

The present application is a continuation-in-part of Application Ser. No. 07/398,479 filed Aug. 25, 1989, now U.S. Pat. No. 4,965,413.

BACKGROUND OF THE INVENTION

This invention relates generally to electric fence insulators, and pertains more particularly to an insulator having a latching capability so that various types of electric fence conductors can be securely held.

While several types of conductors have been used for electric fences in the past, the employment of tape-type conductors has proved to be quite popular. Hence, a need now exists for an electric fence insulator that will securely hold the braided tape-type of conductor, yet also accommodate other types of conductors, such as the plain bare wire type and the twisted plastic/metal strand type.

SUMMARY OF THE INVENTION

Consequently, one object of the present invention is to provide an electric fence insulator that will securely anchor the most common types of conductors currently being marketed.

Another object of our invention is to provide an electric fence insulator possessing special utility for holding tape-type conductors. In this regard, our insulator prevents the tape-type conductor from twisting while being held, yet permitting longitudinal movement to occur.

Also, it is within the purview of the present invention to accommodate tape-type conductors having various widths.

Another object of the invention is to provide an electric fence insulator in which the conductor can be easily attached to the insulator, but readily detached if the need later arises for doing so.

Electric fences traverse various terrains, the electric fence posts being at times located in valleys and at other times on the crests of hills. When in a valley, an upward pull is exerted on the electric conductor tending to lift the conductor, whereas when the conductor passes over the crest of a hill, the conductor is pulled downwardly. An aim of the present invention is to make certain that the conductor, irrespective of its type, will be securely held in place irrespective of the ground's profile.

Still further, it is planned that the electric fence insulator in accordance with our invention can be manufactured at a relatively low cost.

Yet another object of the invention is to provide an electric fence insulator that can be fabricated so as to be attached to any of the variety of fence posts commonly encountered on farms, ranches and ranges. More specifically, our insulator can be easily manufactured so as to be attached to wooden fence posts, round metal posts, and T-shaped metal posts. Stated somewhat differently, the latching capability of our electric fence insulator can be factory adapted for the particular post on which the insulator is to be mounted.

Briefly, our invention envisages a pair of panels, one panel being integral with the body of the insulator and the other panel being resiliently connected at its lower end to the lower end of the first panel so as to be biased forwardly. A cooperable latching mechanism is disposed at the upper ends of the panels. In this regard, the panel that is integral with the body has an upwardly directed keeper portion, whereas the other panel has an inverted hook portion. Both portions have inclined or angled cam edges. Through the agency of an upwardly extending tab that projects above the keeper portion, the latch mechanism can be readily engaged so as to hold the electric fence conductor captive, yet permit the release of the conductor if circumstances later so dictate. Further, the hook portion includes a rib that fits in a channel in the keeper portion for preventing slideable movement of the overlapping edges when the latch mechanism is engaged.

BRIEF DESCRIPTION OF THE DRAWINGS

FIG. 2 is a view taken in the direction of line 2—2 of FIG. 1;

FIG. 3 is a view also taken in the direction of line 2—2 of FIG. 1, but with the insulator shown in its open or conductor-receiving position; and FIG. 4 is a partial, perspective view, but with portions of the insulator shown in phantom outline to expose internal details.

DESCRIPTION OF THE PREFERRED EMBODIMENT

Figure 1:
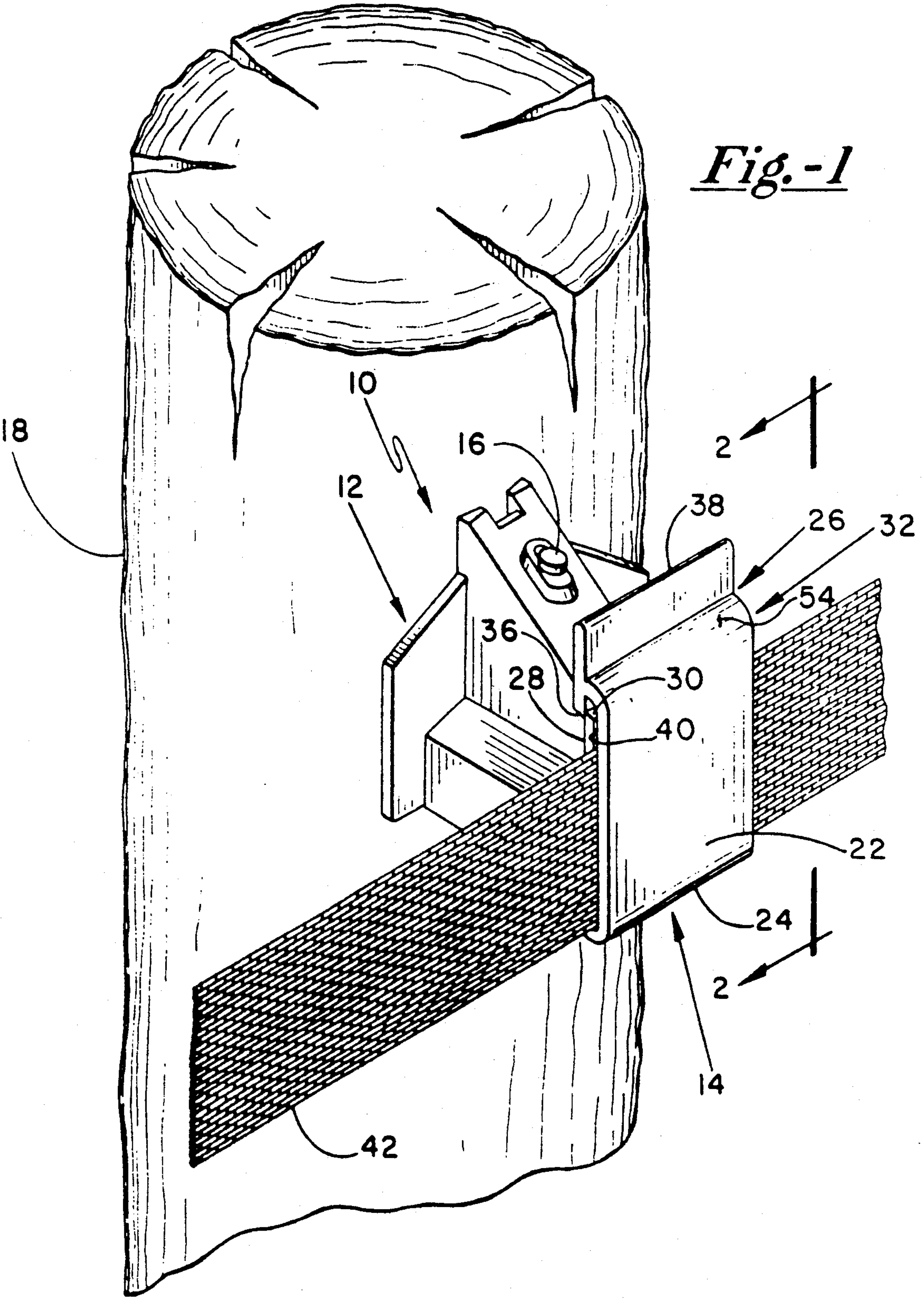
FIG. 1 is a perspective view of an electric fence insulator illustrating our invention, the insulator holding a tape-type conductor.

Our electric fence insulator has been indicated in its entirety by the reference numeral 10. The insulator 10 includes a body 12 and a conductor-holding clip unit 14 which will be presently described in detail. In this instance, the insulator 10 is attached by a nail 16 to a wooden post 18. The body 12 of the insulator 10 corresponds to that shown in U.S. Pat. No. 4,028,489 granted on June 7, 1977 to Albert T. Berg, Jr. et al. for "Plastic Nail-On Electric Fence Insulator." The insulator 10 may also be designed to be mounted on a metal round post and in such a case reference can be made to U.S. Pat. No. 3,749,820 issued July 31, 1973 to Howard Langlie et al. for "Electric Fence Insulator." When the insulator 10 is intended to be mounted on a T-shaped post, reference may be made to U.S. Pat. No. 3,820,758 granted on June 28, 1974 to Albert T. Berg, Jr. et al. for "Electric Fence Insulator For T-Shaped Posts." As the description progresses, it will be clear that the invention is not restricted to the particular type of posts, for the electric fence insulator 10 can be designed for attachment to any one of the several posts frequently encountered as far as electric fences are concerned. The insulator 10 is preferably fabricated from linear polyethylene plastic.

With the foregoing information in mind, a detailed description of the conductor-holding clip unit 14 will now be presented. The clip unit 14 includes a rear panel 20 and a forward panel 22, there being a bight portion 24 that integrally, resiliently, connects the first, lower ends of the two panels 20 and 22 together and at the same time biases the panel 22 forwardly into the position depicted in FIG. 3. The rear panel 20 in the most preferred form is integrally formed with body 12. A vertical web 50 integrally extends from rear panel 20 and integrally terminates in body 12.

What will be termed a latch mechanism 26 includes a keeper portion 28 integral with the opposite, upper end of the rear panel 20, the keeper portion 28 having an upper inclined or angled edge 30. A channel 52 extends axially through keeper portion 28 generally intermediate its edges and extending vertically downward from angled edge 30. In the most preferred form, web 50 is axially aligned with channel 52.

The latch mechanism 26 additionally includes an inverted U-shaped hook portion 32 integral with the opposite, upper end of the forward panel 22. More specifically, the hook portion 32 has a bight portion 54 extending from the upper end of forward panel 22 and terminating in a downwardly projecting dog 34, the dog 34 having an inclined or angled edge 36.

As best understood from FIG. 2, the dog 34 is inwardly offset from the general plane of the forward panel 22 by bight portion 54. Also, as can be understood from FIG. 2, the angled edges 30 and 36 vertically overlap each other when latch mechanism 26 is engaged.

Integral with the hook portion 32 is an upwardly directed tab 38 that serves as a handle for engaging the latch mechanism 26. Also integral with the hook portion 32 is a vertical rib 56 extending between the dog 34 and the bight portion 54. Rib 56 is of a size and shape for slideable receipt within channel 52 of keeper portion 28 and in the most preferred form is triangular in shape.

Although the panel 22 is resiliently biased forwardly, as can be perceived from FIG. 3, when the latch mechanism 26 is closed, as in FIGS. 1 and 2, a slot 40 is provided for the secure holding of a braided tape-type conductor 42. This type of conductor is generally referred to as "poly tape" in the trade.

Having presented the foregoing description, the benefits to be derived from our invention should be readily appreciated. All that the user need do is to insert the tape 42 downwardly with the latch mechanism 26 open, the open condition being shown in FIG. 3, so that the lower edge of the tape rests on the bight portion 24. The slot 40 is of such a height so as to allow a tape 42 of any practical width to be held by the insulator 10. Once the tape 42 has been inserted in the insulator 10 in the manner readily deducible from FIG. 3, then the farmer or rancher need only grasp the tab 38, moving the tab 38 to the right as viewed in FIG. 3. When the angled edge 36 meets the angled edge 30, the edge 36 rides over the edge 30. In other words, the edge 30 acts as a cam for the edge 36. Sufficient movement to the right in FIG. 3 will complete the latching action, for when the condition pictured in FIGS. 1 and 2 is reached, the dog 34 snaps into an obstructive engagement with the keeper portion 28, with rib 56 fitting into channel 52. Rib 56 located within channel 52 prevents hook portion 32 from moving side to side relative to keeper portion 28 or in other words prevents slideable movement between the overlapping edges 30 and 36 of the keeper portion 28 and the hook portion 32, and thus keeping latch mechanism 26 in its proper place, shape and form.

Should it be desirable to disengage or re-open the latch mechanism 26, all that the farmer or rancher need do is to grasp the tab 38 once again and pull the tab 38 to the left as viewed in FIG. 3. The connection of the tab 38 and the dog 34 therebeneath to the upper end of the panel 22 permits the dog 34 to be "rocked" out of engagement so that the insulator 10 again assumes the relationship illustrated in FIG. 3.

It is important to appreciate that the angled edges 30 and 36 vertically overlap somewhat as can be readily discerned from FIG. 2. Further, it is important to appreciate that rib 56 is fitted in channel 52 when edges 30 and 36 overlap. It is the overlapping and fitting that effect the latching of the mechanism 26 so as to securely retain the tape 42 in the slot 40, the slot 40 resulting when the latch mechanism 26 is engaged as shown in FIGS. 1 and 2. It has already been mentioned that the insulator 10 is preferably fabricated from linear polyethylene plastic; this type of plastic possesses an excellent degree of inherent resiliency, particularly when the insulator 10 is fabricated with a thickness on the order of one-eighth inch (0.32 centimeters).

We claim:

1. An electric fence insulator comprising, in combination: a body having means at the rear thereof for attaching the body to a fence post; a first panel connected to the front of said body; a second panel connected to said first panel; a keeper portion at an end of said first panel; a hook portion at an end of said second panel, said portions having overlapping edges; and means for preventing slideable movement between the overlapping edges of the keeper portion and the hook portion.

2. An electric fence insulator in accordance with claim 1 wherein said preventing means comprises, in combination: a channel formed in one of the overlapping edges of the keeper portion and the hook portion; and a rib formed adjacent the other of the overlapping edges of the keeper portion and the hook portion, with the rib fitting in the channel when the edges overlap.

3. An electric fence insulator in accordance with claim 2 wherein the channel is formed in the edge of the keeper portion; and wherein the electric fence insulator further comprises, in combination: a web extending from the first panel opposite the second panel and connected to the body.

4. An electric fence insulator in accordance with claim 2 wherein the first panel has an end opposite to the keeper portion and the second panel has an end opposite to the hook portion; and wherein the second panel is connected to said first panel by means for resiliently connecting the opposite ends of the first and second panels.

5. An electric fence insulator in accordance with claim 4 wherein the resiliently connecting means comprises a U-shaped bight portion connecting the opposite ends of the first and second panels together, with the U-shaped bight portion allowing movement of the second panel relative to the first panel between an open condition with the second panel extending at an angle from the first panel and a closed condition with the second panel located generally parallel to the first panel.

6. An electric fence insulator in accordance with claim 5 wherein the resiliently connecting means biases the second panel into the open condition.

7. An electric fence insulator in accordance with claim 5 in which said first panel, said second panel, said bight portion, said keeper portion, and said hook portion all have substantially the same thickness.

8. An electric fence insulator in accordance with claim 5 in which said first panel, said second panel, said bight portion, said keeper portion, and said hook portion are integrally formed.

9. An electric fence insulator in accordance with claim 2 further comprising, in combination: a tab extending upwardly from said hook portion.

10. An electric fence insulator in accordance with claim 9 in which said hook portion is U-shaped so that the edge thereon is rearwardly offset from the general plane of said second panel and said tab extends upwardly from said rearwardly offset edge.

11. An electric fence insulator in accordance with claim 10 in which the edges on said portions are angled so that they can be cammed relative to each other when said hook portion is urged in the direction of said keeper portion to effect a latching of said hook portion with said keeper portion, said tab facilitating an unlatching of said hook portion from said keeper portion.

12. An electric fence insulator in accordance with claim 11 in which said angled edges vertically overlap each other.

13. An electric fence insulator in accordance with claim 9 in which said first panel, said second panel, said keeper portion, said hook portion and said tab are integrally formed.

14. An electric fence insulator in accordance with claim 9 in which said first panel, said second panel, said keeper portion, said hook portion and said tab all have substantially the same thickness.

15. An electric fence insulator in accordance with claim 2 in which said hook portion is U-shaped so that the edge thereon is rearwardly offset from the general plane of said second panel.

16. An electric fence insulator in accordance with claim 15 in which the edges on said portions are angled so that they can be cammed relative to each other when said hook portion is urged in the direction of said keeper portion.

17. An electric fence insulator in accordance with claim 2 in which said overlapping edges vertically overlap each other.

18. An electric fence insulator in accordance with claim 2 in which the first and second panels are planar.

* * * * *